(12) United States Patent
Kienholz (10) Patent No.: US 6,942,202 B2
(45) Date of Patent: Sep. 13, 2005

(54) HYBRID PNEUMATIC-MAGNETIC ISOLATOR-ACTUATOR

(75) Inventor: David A. Kienholz, San Jose, CA (US)

(73) Assignee: CSA Engineering, Inc., Mountain View, CA (US)

( * ) Notice: Subject to any disclaimer, the term of this patent is extended or adjusted under 35 U.S.C. 154(b) by 0 days.

(21) Appl. No.: 10/718,353

(22) Filed: Nov. 21, 2003

(65) Prior Publication Data

US 2004/0099784 A1 May 27, 2004

Related U.S. Application Data

(62) Division of application No. 10/078,320, filed on Feb. 20, 2002.

(51) Int. Cl.$^7$ .............................. F16M 1/00; F16F 9/10
(52) U.S. Cl. .................. 267/140.14; 268/136; 188/389
(58) Field of Search ................................ 188/378, 379, 188/380; 267/136, 140.13, 140.14, 64.11, 64.12, 122; 310/80

(56) References Cited

U.S. PATENT DOCUMENTS

| | | | |
|---|---|---|---|
| 5,060,959 A | | 10/1991 | Davis et al. |
| 5,263,558 A | * | 11/1993 | Yamaoka .................... 188/267 |
| 5,614,778 A | * | 3/1997 | Terao et al. .................. 310/80 |
| 5,788,029 A | | 8/1998 | Smith et al. |
| 6,003,849 A | * | 12/1999 | Davis et al. ........... 267/140.14 |
| 6,029,959 A | | 2/2000 | Gran et al. |
| 6,065,741 A | | 5/2000 | Davis et al. |
| 6,129,185 A | | 10/2000 | Osterberg et al. |
| 6,196,514 B1 | | 3/2001 | Kienholz |

* cited by examiner

Primary Examiner—Matthew C. Graham
(74) Attorney, Agent, or Firm—Rick G. Brewster (57) ABSTRACT

The invention disclosed is a compact and lightweight hybrid pneumatic-magnetic isolator-actuator capable of large force, substantial stroke and bandwidth actuation with near frictionless operation and vibration isolation with very low break frequency. Pneumatic and magnetic forces are applied to a single carriage comprised primarily of a coaxially arranged air piston and coil. The carriage is driven relative to a frame or housing including an internally mounted cylindrical piston sleeve and magnetic actuator body. A combination of air bearings and air bearing piston construction provide for frictionless motion of the carriage relative to the frame. The pneumatic piston provides the actuation force for both static loads and low frequency dynamic loads. An integrally mounted sensor and control unit determine the pressure error resulting at the pneumatic piston. The control unit utilizes the pressure error to drive a high bandwidth magnetic actuation capability in parallel with the pneumatic actuation capability. An air tank of prescribed volume may be connected to the pneumatic piston for effecting a desired air-spring stiffness upon the isolator-actuator.

5 Claims, 7 Drawing Sheets

HYBRID PNEUMATIC-MAGNETIC ISOLATOR-ACTUATOR

CROSS-REFERENCE TO RELATED APPLICATIONS

This application is a divisional of pending U.S. patent application Ser. No. 10/078,320, filed Feb. 20, 2002.

STATEMENT REGARDING FEDERALLY SPONSORED RESEARCH

This invention was made with U.S. Government support under a second level subcontract to Contract No. F29601-97-C-0001 awarded by the Department of the Air Force. The U.S. Government has certain royalty-free rights in this invention.

BACKGROUND OF THE INVENTION

The present invention relates to vibration isolators and position control actuators. More particularly, the present invention pertains to a compact hybrid pneumatic-magnetic isolator-actuator capable of large stroke, near frictionless operation, and high ratio of actuation force to weight.

Passive isolation systems, composed of multiple passive vibration isolators, are commonly used for preventing vibration force input to a payload from a vibrating support base. Base motions of a frequency sufficiently higher than the break frequency of the isolation system (i.e. the natural frequency of the payload on the isolators) are significantly attenuated by the isolators and are prevented from passing into and disturbing the payload. Soft mounts (passive isolators) simply allow the payload to be held still in inertial space by its own inertia, but only at frequencies high enough that inertia forces on the payload are large compared to stiffness forces transmitted through the isolators, i.e. at frequencies above the system natural frequencies.

The static load position of the payload and the movement of the payload under low frequency dynamic loads, i.e. those loads having vibration frequency components below the break frequency, are dependent upon the spring stiffness of the isolators, the mass of the payload, and the low frequency acceleration forces being applied to the payload. When the body acceleration forces are constant, payload position relative to the base remains constant. When low frequency body acceleration forces upon a payload vary, such as would the forces on a payload in an aircraft undergoing various maneuvers, the payload position relative to the base varies. This is often detrimental to the function of the payload.

The nature of passive isolators is that they do not provide for force or position control that is necessary for payload stabilization when varying low frequency body forces are applied. Rather the force applied to the payload by a passive isolator is dependent upon the displacement of the payload relative to the support base. Passive isolation therefore always involves a compromise between position control accuracy and dynamic isolation.

To control the position of the payload relative to its base and maintain vibration isolation, an active isolator, i.e. an isolator-actuator is required. The isolator-actuator actively controls the low-frequency force applied to the payload at any and all positions of the payload relative to the base, i.e. regardless of the extension position of the support isolators.

Position actuators such as hydraulic actuators are commonly used for position control. Hydraulics can afford significantly high bandwidth position control because of the inherent incompressibility of the hydraulic fluid. However hydraulic actuators have several disadvantages. Position control and base motion isolation can be effected only up to the bandwidth limit. At the bandwidth limit, often set by dynamics of the payload, the actuators become stiff and unable to provide isolation to base motions of higher frequency. Secondly, high fluid pressures, which allow wide bandwidth performance, require tight sliding seals to prevent leakage. These seals inevitably introduce friction, which degrades high frequency isolation and introduces a deadband into low frequency position control. In effect, seal friction produces dynamic forces on the payload, thereby defeating the desired isolation function. Finally, hydraulic actuators are undesirable for use in vacuum because even very small oil leakage would cause contamination of any nearby equipment.

Pneumatic isolators with air bearing support have been used for providing low to zero friction payload support. However, a dilemma faced in the use of pneumatic isolators as actuators is that the compressibility of the air in the isolator-actuator and pneumatic control valve severely limits the control bandwidth.

Additional control problems arise from the control system components necessary to drive the actuators. Servo-valves used for either hydraulic or pneumatic control are commonly proportional spool valves, which always have a degree of friction and therefore produce hysteresis in the actuator control.

Many of the problems described above have been addressed in an earlier patent, U.S. Pat. No. 6,196,514 B1, by this inventor, which disclosed a Large Airborne Stabilization/Vibration Isolation System (AS/VIS). In that patent a payload is supported by an array of frictionless pneumatic isolators integrated with large, high-force electromagnetic voice coil actuators. The pneumatic isolators support the entire payload weight with very low stiffness and no friction. The voice coil actuators act in parallel with the isolators to effect position control with reasonably high bandwidth without degrading high-frequency isolation.

However the AS/VIS design has several limitations. The voice coil actuators are quite heavy, being required to control the position of a large payload. The passive elements connecting the payload to ground in vertical and horizontal directions are "nested", meaning one rests upon the other and they act in series. While producing excellent isolation, the system is too fragile to meet the crash load requirements for an airborne system, and thus requires a parallel system of slack tethers in order to meet airworthiness requirements. Finally, the uncontrolled exhaust from the air bearings of the isolator-actuators render the system unsuitable for use in vacuum. The present invention advances the state of the art by addressing all three of these limitations.

Other devices of the prior art have offered damping and vibration isolation with active control of the isolator damping characteristics, but they do not provide both actuation with high force capacity and the isolation characteristics of very soft passive mounts. U.S. Pat. No. 6,003,849 discloses a hybrid isolator and structural control actuator strut. In this device communicating fluid reservoirs are used to provide payload motion damping and vibration isolation, and an active enhancement mechanism is used to alter the fluid pressure in the fluid reservoirs to modify the damping characteristics and add modest actuation capability to the device. This device fails to provide the large actuation force and stroke capability and low break frequency isolation needed for stabilization of large airborne optical systems. U.S. Pat. No. 6,129,185 similarly offers vibration damping and isolation while magnetically destiffening the support system to offer lower isolation frequencies, but it does not afford the combined actuation ability and high degree of isolation of the present invention.

Actuation capability is afforded in other devices of the prior art but without the high degree of isolation, and near frictionless operation of the present invention. U.S. Pat. No. 5,060,959 describes an electrically powered active suspension strut for a vehicle. This device incorporates a spring or fluid system for load support and therein fails to provide the very low frequency vibration isolation and near frictionless actuation needed. Additionally, actuation capability is limited to the force capability of the electric motor.

There remains a need for a compact, lightweight, high bandwidth actuator having essentially frictionless performance and relatively large stroke and force capacity while also having the characteristics at high frequency of a very soft passive. The invention described herein is such a device.

BRIEF SUMMARY OF THE INVENTION

The invention disclosed is a compact and lightweight hybrid pneumatic-magnetic isolator-actuator capable of large force, substantial stroke and high bandwidth actuation with near frictionless operation and which behaves at high frequency like a very soft passive isolation mount.

The invention obtains superior low-frequency position control and simultaneous, superior base motion isolation. The invention controls the low-frequency forces applied to the payload according to a user-specified control law and sensor inputs, rather than simply in passive response to payload position. High frequency forces are still determined by base-relative position but are kept to low levels, similar to very soft passive isolators. The invention also allows for maintaining position control relative to an arbitrary reference, which may itself be moving in inertial space, rather than only relative to the base on which the payload is supported.

The invention combines pneumatic and magnetic forces on a single moving carriage assembly, comprised of a coaxially arranged piston and lower air bearing, journal shaft, coil and coil carrier structure. This carriage moves on air bearings relative to a frame or housing. The frame consists of a cylindrical sleeve surrounding the piston, a magnet body surrounding the coil, an upper air bearing surrounding the journal shaft, and a main housing supporting the cylindrical sleeve, magnet body, and upper air bearing. The outer diameter surface of the cylindrical sleeve serves as the journal for the lower air bearing. The construction of the invention thus allows for parallel pneumatic and magnetic forces to be developed between the carriage and frame in the form of a relatively lightweight and compact uniaxial strut. The frame of the strut attaches by a ball joint or universal joint to the supporting base and the carriage attaches by a similar ball joint or universal joint to the supported payload. The struts may be used in sets of six or more to completely support a payload in all degrees of freedom.

An important aspect of the invention when constructed in the form of a uniaxial strut is that bending loads are avoided. Substantially higher loads can be carried than that carried by those systems of the prior art which rely on the nesting of separate isolators and actuators.

The pneumatic piston provides static and low frequency actuation force for supporting the payload weight and for maintaining a desired payload position against low-frequency disturbances, such as inertial loads on the payload caused by aircraft maneuvering. Gas pressure, such as from air, nitrogen, or other gas, applied to the piston is controlled by a pressure servo. The pressure servo is comprised of a pneumatic servo-valve, a suitable drive amplifier and compensation for the valve, and a pressure transducer, all arranged in a feedback loop. The pressure servo allows the pressure on the piston, and thus the piston force, to be controlled by an input command signal. The invention thereby incorporates the capabilities of a pneumatic actuator with proportional control of its output force.

In a preferred embodiment, the piston force command may be derived from transducers sensing the payload position, either relative to the supporting base or to some other reference which may itself be moving relative to the base. Thus the pneumatic actuator capability becomes part of the position control system for the payload. The bandwidth of this position control system is small compared to the lowest flexural natural frequency of the payload, both to ensure control system stability and to avoid exciting resonances of the payload. Above the pressure servo bandwidth, the strut behaves like a conventional pneumatic spring, with stiffness determined by piston area and total gas volume. This spring can be quite soft for good low through high frequency isolation since, like any pneumatic spring, its stiffness is not related to vertical deflection, or sag, under the payload weight. Like any pneumatic spring, the static sag due to payload weight can be adjusted to zero by controlling the gas pressure inside the spring. Furthermore, since the actuation is effected by venting air in and out of the cylinder, the actuator is not required to waste part of its force capacity in overcoming the passive stiffness force of a parallel spring, as is the case in active destiffening schemes. In effect, the pneumatic actuator and pneumatic spring are one and the same.

The pneumatic actuator capability, by itself as described above, remains limited in bandwidth by compressibility of the gas medium and is subject to hysteresis due to friction in the spool mechanism of the pneumatic servo-valve. Both problems are addressed and largely overcome by a magnetic actuator capability operating in parallel to the pneumatic actuator capability. The magnetic actuator capability is effected by a current supplied to a coil surrounding the magnetic actuator body that is controlled to be proportional to the instantaneous error in the pressure servo, i.e. the difference between the commanded pressure and the actual pressure. The proportionality constant is chosen such that the magnetic force exactly makes up for this difference, and thus corrects the error. This effective magnetic actuator subsystem comprised within the invention is capable of doing this because of its inherently wider bandwidth and linearity.

The present invention, effecting a hybrid pneumatic-magnetic actuator, achieves essentially the dynamic behavior (i.e. frequency response) of the magnetic actuator alone, however it is much lighter than an all-magnetic actuator of the same force capacity. This is because the low frequency components of the output force are produced by the pneumatic actuator portion which has an inherently greater ratio of actuation force to weight.

The invention is particularly well suited to the problem of stabilizing and vibration-isolating a sensitive payload within a large aircraft. In that environment, much of the disturbances which the stabilizing system must counteract are at low frequency, being due to aircraft maneuvering and low-order flexural modes of the airframe. A large part of the required actuation force can thus be produced by the relatively lightweight pneumatic subsystem. The magnetic subsystem, with its lower thrust/weight ratio, can be fairly small since it need only supply the smaller, higher frequency part of the force spectrum, plus correcting for error due to phase loss and hysteresis in the pneumatics.

The magnetic force is produced by a coil attached and mounted coaxially to the piston and journal shaft by a coil carrier structure. The magnet body of the voice coil actuator is mounted within the housing coaxial with the journal shaft. The coil carrier structure passes through one end of the magnetic actuator body and supports the coil within the envelope of the magnetic actuator body. Magnetic forces developed between the coil and magnetic actuator body are transferred from the coil through the coil carrier structure and into the journal shaft thus adding the magnetic force to the pneumatic force applied via the piston to the journal shaft.

Furthermore, the isolator-actuator disclosed provides for near frictionless actuation and motion of the actuator carriage through the support of the carriage entirely on an air or gas film within the frame. In a preferred embodiment, the invention provides for the piston force to be exactly proportional to piston pressure, i.e. there being no friction drag between the piston and cylinder. Such behavior is ensured by the design of the frictionless piston. The frictionless piston is essential in order to use the magnetic actuator to correct for error in the pneumatic actuator. Frictionless behavior allows the instantaneous pneumatic force to be exactly measured by measuring the instantaneous gas pressure. Any friction would produce a difference between the true pneumatic force and that inferred from the product of measured pressure times known piston area.

In this embodiment the carriage is comprised of a pneumatic piston that is supported and guided within a cylindrical sleeve fixed to the frame. Surrounding the sleeve is a cylindrical lower air bearing. The lower air bearing and piston are coaxial and are both joined to a flange on the lower end of the journal shaft such that they all move together as part of the carriage. The bearing is held in a housing rigidly attached to the flange. The piston is attached via a connecting rod with spherical joints at either end. These joints allow the piston to align itself with the cylinder in spite of small dimensional errors in fabrication of the carriage and frame. Small metering orifices through the piston skirt produce an air bearing film around the skirt and cause the piston to be self-centering within the cylinder. This piston moves axially within the cylinder without friction because the self-centering action of the air bearing film prevents the piston from touching the cylinder. The air bearing film is supplied from the pressurized air beneath the piston, which also produces the axial force on the piston. The piston outer surface is guided on the air film along the sleeve's inner cylindrical surface, and the lower air bearing inner cylindrical surface is guided on an air film by the sleeve's outer cylindrical surface. The upper end of the carriage assembly is likewise supported by a journal air bearing. The bearing is supported on the strut frame and an air film is developed between the inner diameter of the bearing and the outer diameter of the journal shaft. Both upper and lower air bearings are pressurized with compressed air from an external source. The motion of the carriage is thereby constrained to move along the longitudinal axis of the strut and does so supported completely on a film of air. The only friction is that which may be produced by the rubbing of the small internal air lines supplying the bearings and wires supplying current to the magnetic actuator coil against the inner surfaces of the strut main housing.

In the embodiment the piston is coaxially connected to a journal shaft via a common connecting plate, or flange plate, such that the journal shaft transfers the piston pressure force to the payload. The journal shaft, being part of the carriage, is also laterally supported by an upper air bearing fixed within the frame such as to provide alignment and frictionless longitudinal motion of the carriage within the frame of the strut. In a preferred embodiment the frame is further comprised of a housing which serves to contain the gases exhausted from the air bearings.

The effective air-spring stiffness applied by the isolator-actuator to the payload is determined by the gas volume, piston area, gas pressure, and gas thermodynamic constants. This air-spring stiffness in combination with the payload mass properties determines the isolation break frequency, i.e. the frequency above which isolation will occur. In a further embodiment, to achieve a given desired isolation break frequency, the invention combines an air tank or accumulator with the air piston volume to achieve a total air volume that achieves the required air-spring stiffness for the payload mass being supported. The larger the added volume of the air tank, the lower the air-spring stiffness, and for a given payload mass, the lower the isolation break frequency. Because base support vibration loads of frequencies higher than the break frequency are attenuated and for sufficiently high frequencies not transferred to the payload, a pneumatic actuator serves inherently as a very effective vibration isolation support device. The invention results in a very low vibration frequency isolator and high force, large stroke, high bandwidth actuator.

BRIEF DESCRIPTION OF THE DRAWINGS

The operation of this invention can be best visualized by reference to the following drawings described below.

DETAILED DESCRIPTION OF THE INVENTION

Described in detail below is a compact and lightweight hybrid pneumatic-magnetic isolator-actuator. In the description, for purposes of explanation, numerous specific details are set forth in order to provide a thorough understanding of the present invention. It will be obvious, however, to one skilled in the art that the present invention may be practiced without these specific details. In other instances, well-known structures and devices are shown in simplified form in order to avoid obscuring the present invention. Additionally, though the embodiments described below refer to air as the gas used, any of various gases or combination of gases including nitrogen, argon, and helium could be used for effecting the isolation, pneumatic force, and coil cooling aspects of the invention.

Figure 1:
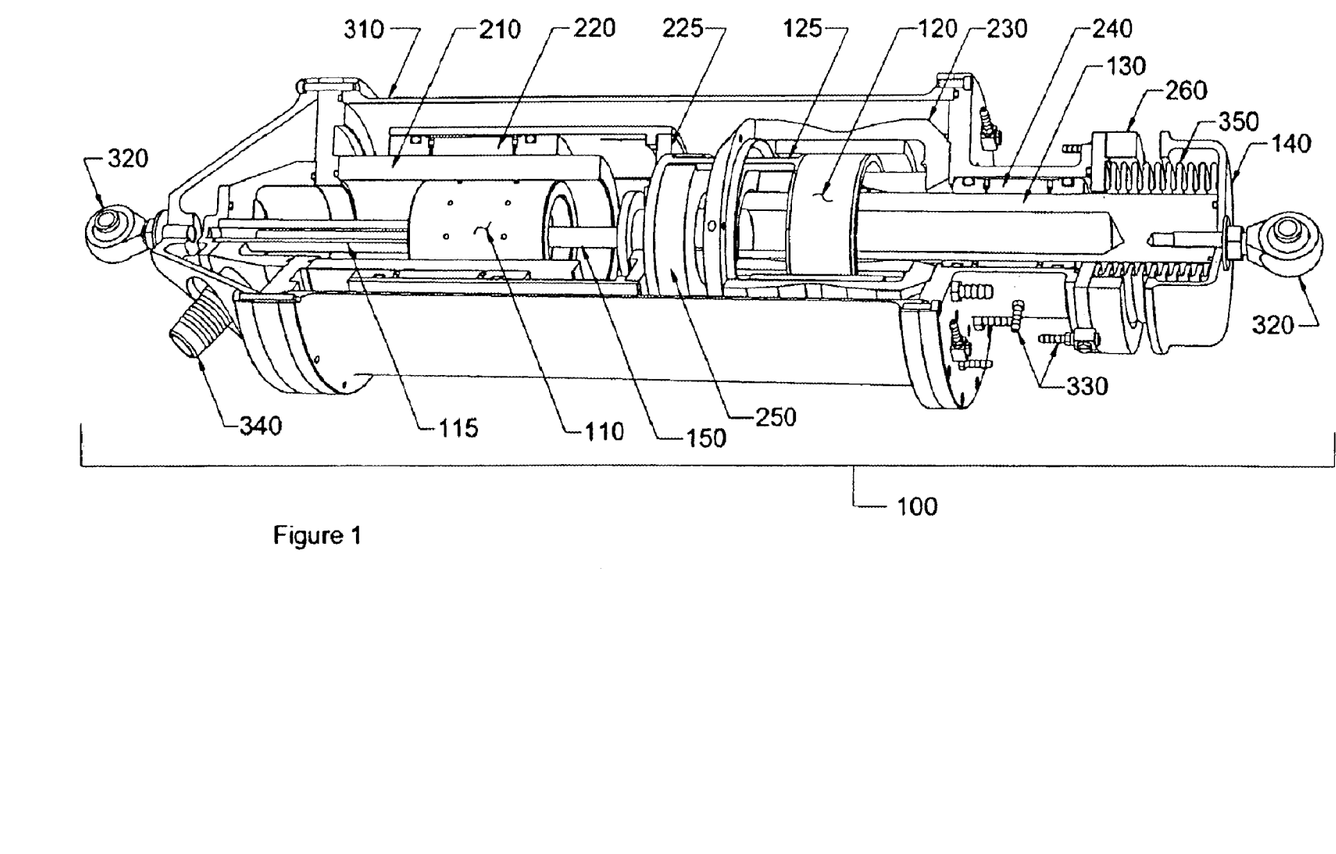
FIG. 1 is a cut away view of a preferred embodiment of a hybrid pneumatic-magnetic isolator-actuator.

FIG. 1 shows a preferred embodiment of the invention where a cut away view of a hybrid pneumatic-magnetic isolator-actuator 100 is depicted. Within the isolator-actuator a single moving carriage is comprised of a coaxially arranged frictionless piston 110, piston connecting rod 150, flange plate 225, lower air bearing 220, journal shaft 130, upper end stop 140, coil 120 and coil carrier structure 125. This carriage is driven relative to a frame or base support housing comprised primarily of a cylindrical piston sleeve 210, magnetic actuator body 230, upper air bearing 240, and airtight housing 310. Airtight housing 310 is also referred to as frame 310.

In accordance with the embodiment shown, the carriage is supported completely on an air film so to effect a frictionless isolator-actuator. The piston 110 is of air bearing construction such that the air supplied below the piston for load carrying also supplies air channel ways within the piston and gap around the piston to create an air film completely covering and supporting the piston in the cylindrical piston sleeve 210. The air load effected on the piston 110 is transferred to a connecting rod 150 which in turn is mounted to a flange plate 225. The lower air bearing 220 is concentric to and surrounds the cylindrical piston sleeve 210 and is also attached to the flange plate 225. The piston 110 and lower air bearing 220 move together through their common attachment to the flange plate 225 and together provide for frictionless lateral constraint and longitudinal motion of the carriage along the cylindrical piston sleeve 210.

The carriage is further comprised of the coil 120, coil carrier structure 125 and journal shaft 130. The coil carrier structure 125 supports the coil 120 and together they move as part of the carriage through the coil carrier structure's attachment to the flange plate 225. The journal shaft 130 is attached at one end to the flange plate 225 and the other end of journal shaft 130 protrudes through the housing 310. Journal shaft 130 is laterally supported by upper air bearing 240 which is mounted in the end of housing 310.

In the embodiment of FIG. 1, at each end of isolator-actuator 100 is a spherical joint 320 for providing moment free attachment of the isolator-actuator between the payload and payload supporting structure. Additionally, extension bumper 250 mounted to flange plate 225 and compression bumper 260 mounted to the end of housing 310 provide cushioning of impact of the carriage at the ends of its travel with respect to the frame. Additionally provided in the embodiment of FIG. 1 is a displacement sensor 115 attached between the bottom of the piston 110 and housing 310 for providing extension data from the isolator-actuator.

Magnetic actuation capability is combined in parallel with the pneumatic actuation capability. Magnetic force application is achieved and applied to the carriage via the coil 120 which is attached to the coil carrier structure 125 and flange plate 225. The magnetic actuator body 230 is mounted within the housing 310 coaxial with the journal shaft 130. The coil carrier structure 125 passes through one end of the magnetic actuator body 230 and supports the coil 120 within the envelope of the magnetic actuator body. Magnetic forces are developed between the coil 120 and magnetic actuator body 230 by controlled application of current to the coil by flexible wires. These forces are transferred from the coil through the coil carrier structure and into the journal shaft thus adding these magnetic induced forces with the pneumatic forces applied via the piston.

Figure 2A:
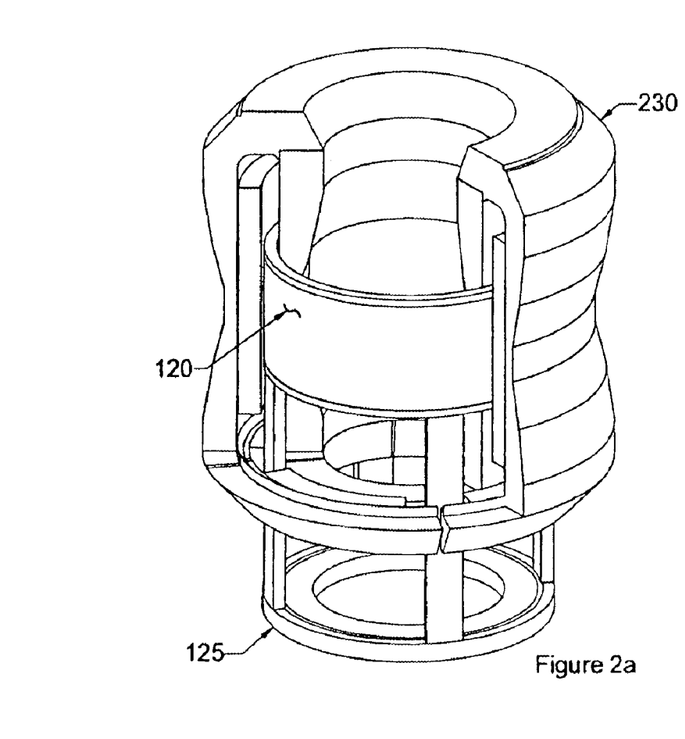
FIG. 2a is a cut away view of the coil, coil carrier structure, and magnetic actuator body in accordance with an embodiment of the invention.
Figure 2B:
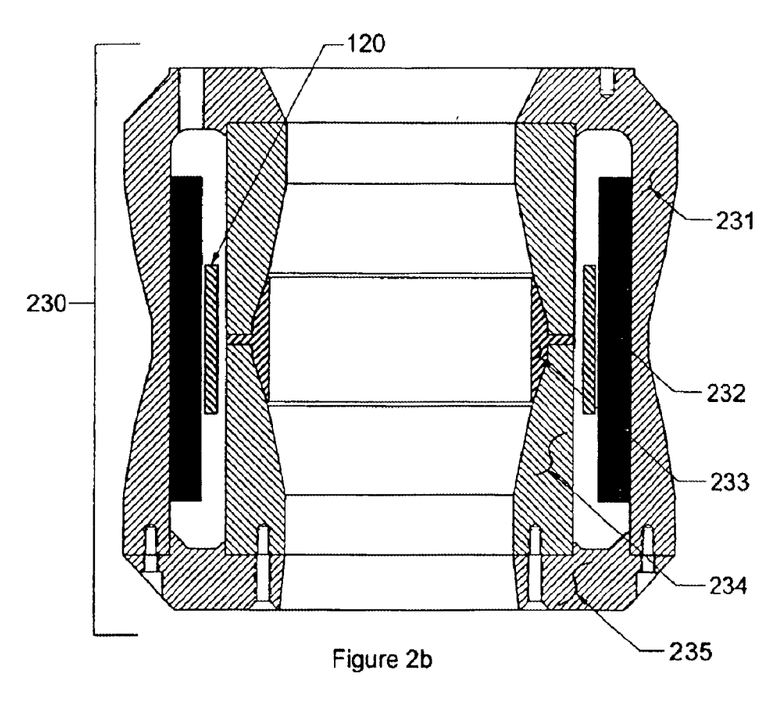
FIG. 2b is a cross section view of the coil and magnetic actuator body in accordance with an embodiment of the invention.

FIG. 2a shows a view of the coil 120 and coil carrier structure 125 in a cutaway view of the magnetic actuator body 230 in accordance with an embodiment of the invention. FIG. 2b further shows a cross section view of the coil 120 and magnetic actuator body 230 in accordance with this embodiment. In FIG. 2b, magnetic actuator body 230 is further comprised of outer iron 231, inner iron 234, and segmented bottom iron 235. An aluminum flux stop 233 is positioned at the axial center of inner iron 234. The purpose of the flux stop 233 is to reduce the permeance of the path taken by magnetic flux produced by the coil, and thus to reduce the coil inductance. Magnet 232 is attached to the inner wall of the outer iron 231. Coil 120 is effectively surrounded by the magnet 232, outer iron 231, inner iron 234, and segmented bottom iron 235.

The volume of air (or gas) supporting the piston determines the effective air-spring stiffness applied by the isolator-actuator to the payload. This air-spring stiffness in combination with the payload mass determines the isolation break frequency. In an embodiment of the invention, to achieve a given desired isolation break frequency, the invention combines an air tank or accumulator with the air piston volume so to achieve a total air volume that achieves the required air-spring stiffness for the payload mass being supported.

Figure 3A:
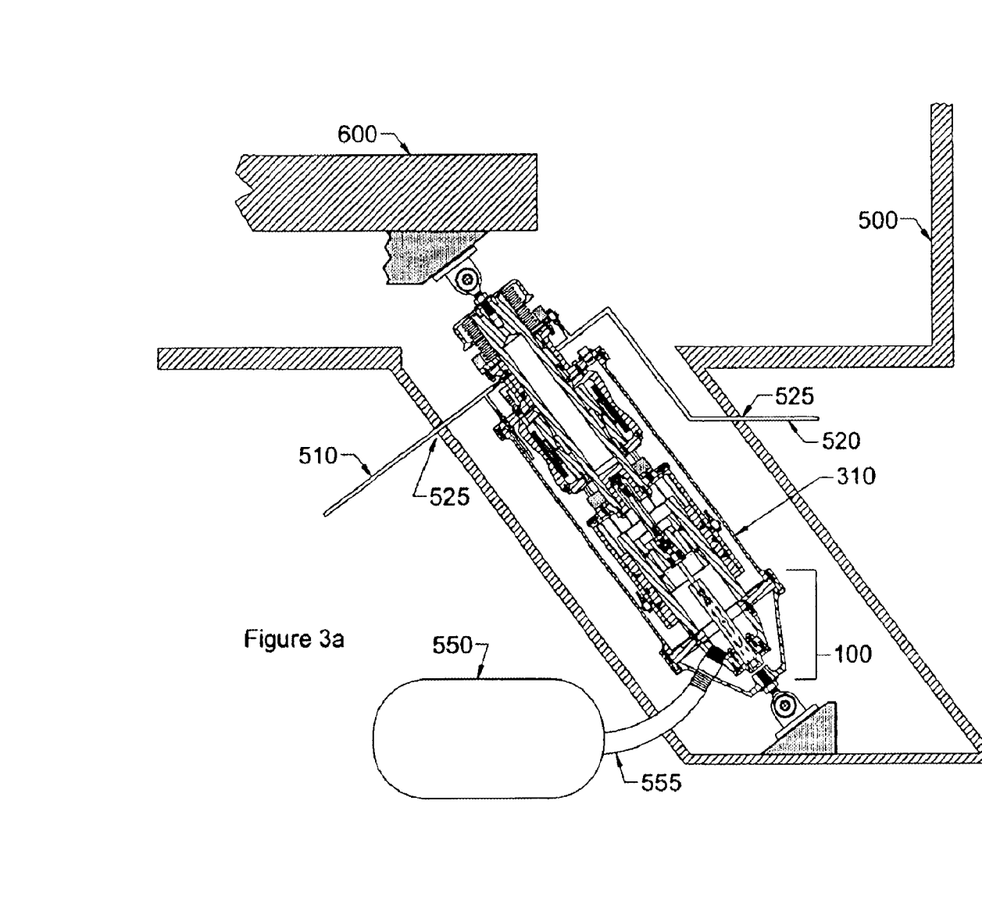
FIG. 3a is a cross section view of a hybrid pneumatic-magnetic isolator-actuator and air supply system incorporated into a vacuum chamber environment in accordance with an embodiment of the invention.

FIG. 3a shows a cross section view of a hybrid pneumatic-magnetic isolator-actuator 100 and air supply system incorporated into a vacuum chamber environment in accordance with an embodiment of the invention. Hybrid pneumatic-magnetic isolator-actuator 100 is connected to accumulator tank 550 by air line 555. The volume of the accumulator tank 550 and air line 555 added to that below piston 110 within hybrid isolator-actuator 100 determines the air-spring stiffness of the system. The larger the total volume, the lower the air-spring stiffness, and for a given payload mass such as bench 600, the lower the isolation break frequency that is achieved. Base support vibration loads of frequencies higher than the break frequency are attenuated and for sufficiently high frequencies are not transferred to the payload 600.

A particular advantage of the hybrid pneumatic-magnetic isolator-actuator 100 is its suitability for use in vacuum environments. In FIG. 3a, isolator-actuator 100 is contained within a vacuum box 500. Compressed air for feeding the air bearings is supplied from outside vacuum box 500 by compressed air line 510. Accumulator 550 supplies compressed air to the air piston from outside vacuum box 500 by air line 555 which utilizes the accumulator port 340 depicted in FIG. 1. All supplied compressed air to isolator-actuator 100 is contained within airtight housing 310 as shown previously in FIG. 1. The supplied compressed air is exhausted from isolator-actuator 100 by air exhaust line 520 which carries the air through the wall of the vacuum chamber box 500 via an airtight feed-through 525.

Figure 3B:
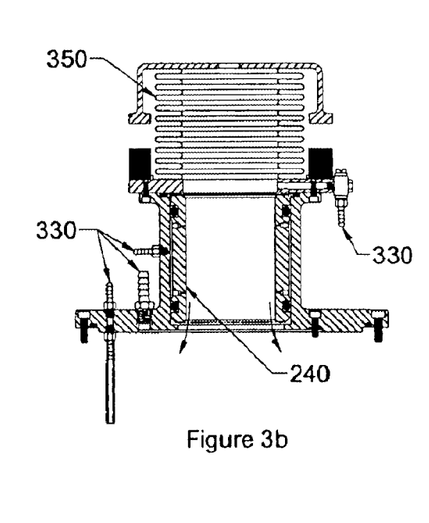
FIG. 3b is a close-up cross section view of the air bearing and bellows detail of the cross section view shown in FIG. 3a in accordance with an embodiment of the invention.

FIG. 3b is a close-up cross section view of the upper air bearing and bellows detail of the cross section view shown in FIG. 3a in accordance with an embodiment of the invention. Air supplied by compressed air line 510 of FIG. 3a feeds upper air bearing 240 via air bearing feed and return fittings 330 shown in FIG. 3b and FIG. 1. Bellows seal 350 shown in FIG. 1 and in large cross section in FIG. 3b works in conjunction with airtight housing 310 to prevent air escape into vacuum box 500 while allowing relatively unimpeded longitudinal motion between the carriage and frame.

In a preferred embodiment, the construction of hybrid pneumatic-magnetic isolator-actuator 100 is such that air supplied to the air bearings 240 and 220 is channeled over coil 120 for providing coil cooling.

An important characteristic of the embodiment of the invention shown is that the construction provides for the parallel pneumatic and magnetic force application to the actuator carriage within a relatively lightweight and compact uniaxial strut. The uniaxial construction avoids the bending loads and associated stresses common to nested actuator systems such that significantly higher maximum loads can be endured. Aircraft payloads may be supported and constrained against crash loads without the need for redundant constraint systems. Further, the control of the hybrid pneumatic-magnetic isolator-actuator is such that the pneumatic piston 110 provides payload positioning force for both static loads and low frequency dynamic loads. The air pressure applied to the piston 110 either directly or by accumulator 550 is controlled by a pressure servo-valve which varies the piston pressure in response to measured and predicted changes in the required isolator-actuator support force or other desired controlled state variable. The invention thereby effects the capabilities of a frictionless pneumatic actuator as well as pneumatic vibration isolator. The low bandwidth control capability inherent in pneumatic actuators is augmented by the high bandwidth magnetic force application ability built into the isolator-actuator to effect a medium to high bandwidth hybrid pneumatic-magnetic isolator-actuator.

Figure 4:
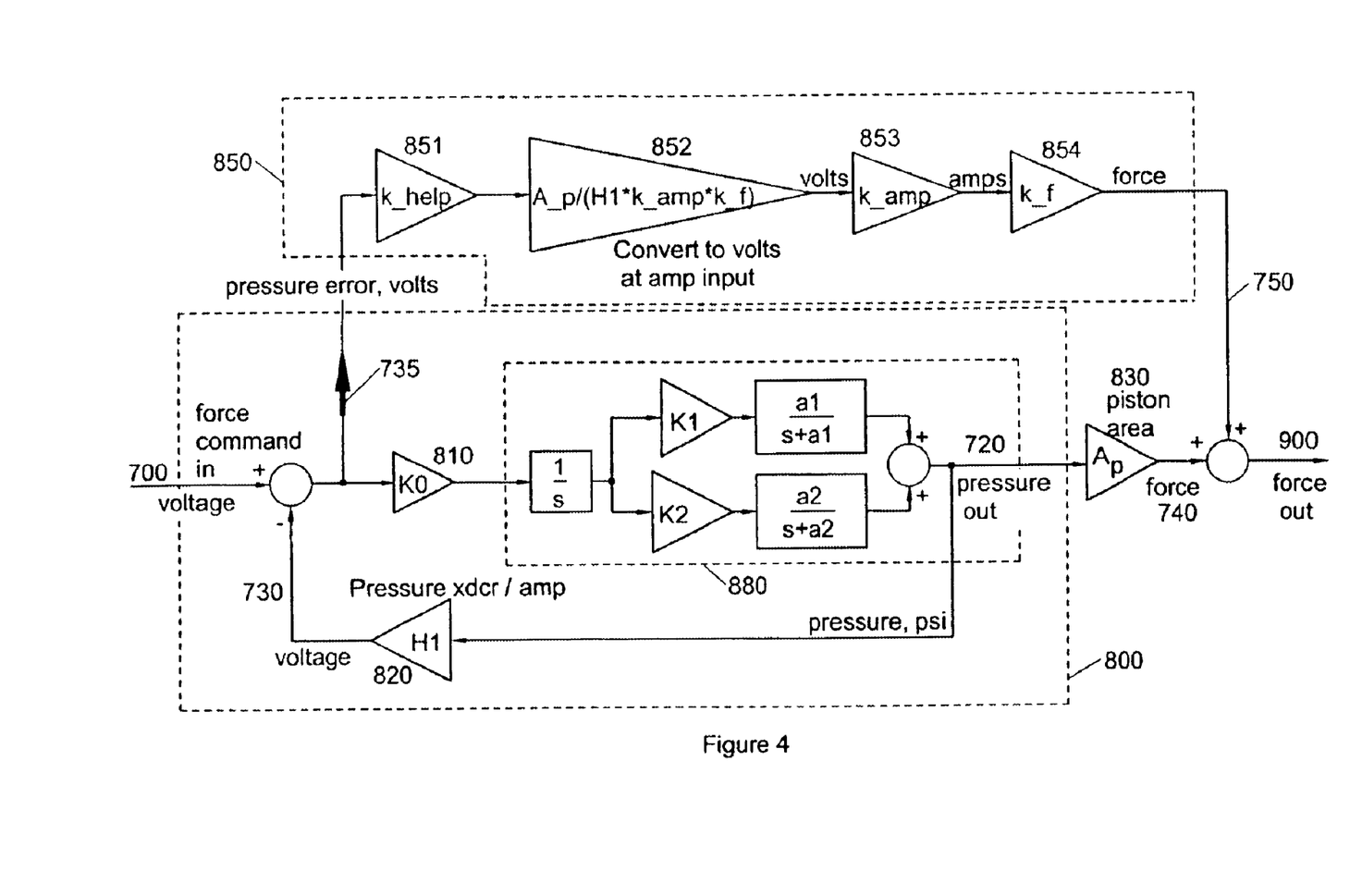
FIG. 4 is a control block diagram of a hybrid pneumatic-magnetic isolator-actuator in accordance with an embodiment of the invention.

The manner for effecting the hybrid pneumatic-magnetic actuation capability is depicted in FIG. 4 which shows a control block diagram of a hybrid pneumatic-magnetic isolator-actuator with integrated control of the magnetic force application in accordance with an embodiment of the invention. In FIG. 4 desired actuator force command voltage 700 is input to the pressure control loop 800 of the pneumatic pressure system. Servo-valve driver amplifier 810 applies amplified command voltage to the pressure drive plant 880 comprised of the servo-valve, pressure supply, and accumulator tank. Plant 880 output air pressure 720 results and is applied over piston area 830 to result in piston pneumatic force 740. Within pressure control loop 800, pressure 720 resulting from plant 880 is measured by pressure transducer/amplifier 820 and the output pressure voltage signal 730 is subtracted from the force command voltage 700. Closed loop pressure control is thereby effected on plant 880 in supplying air pressure over piston area 830 of the pneumatic piston.

As shown further in the control diagram of FIG. 4, the pneumatic system is then combined with a high bandwidth magnetic drive capability to overcome the relatively low bandwidth performance nature of pneumatic actuators. An example hardware embodiment of this magnetic drive capability is the integral construction of the coil 120 and magnetic actuator body 230 into the hybrid pneumatic-magnetic isolator-actuator of FIG. 1. The pressure error voltage 735 is fed forward in an open loop sense to the helper gain amplifier 851. In a preferred embodiment of the invention, helper feed forward loop 850 is constructed such that the helper gain value of 1.0 applied at helper gain amplifier 851 exactly compensates for the measured pressure error in the pressure servo loop 800. Voltage amplifier 852 and current-drive power amp 853 appropriately condition and feed the input error signal 735 to the magnetic actuator 854 such that an exact compensating magnetic force 750 is added to pneumatic force 740. The resulting output force 900 from the hybrid pneumatic-magnetic isolator-actuator therefore has the dynamic bandwidth capability associated with magnetic actuators, but is of substantially larger static and dynamic amplitude capability than that available from a magnetic actuator employed alone.

A preferred embodiment of the invention combines the electronics necessary for implementing the control scheme depicted in FIG. 4 locally with the hybrid pneumatic-magnetic isolator-actuator hardware depicted in FIG. 1. A self-contained unit for providing very low frequency vibration isolation and high stroke, high force, high bandwidth actuation is obtained.

Figure 5:
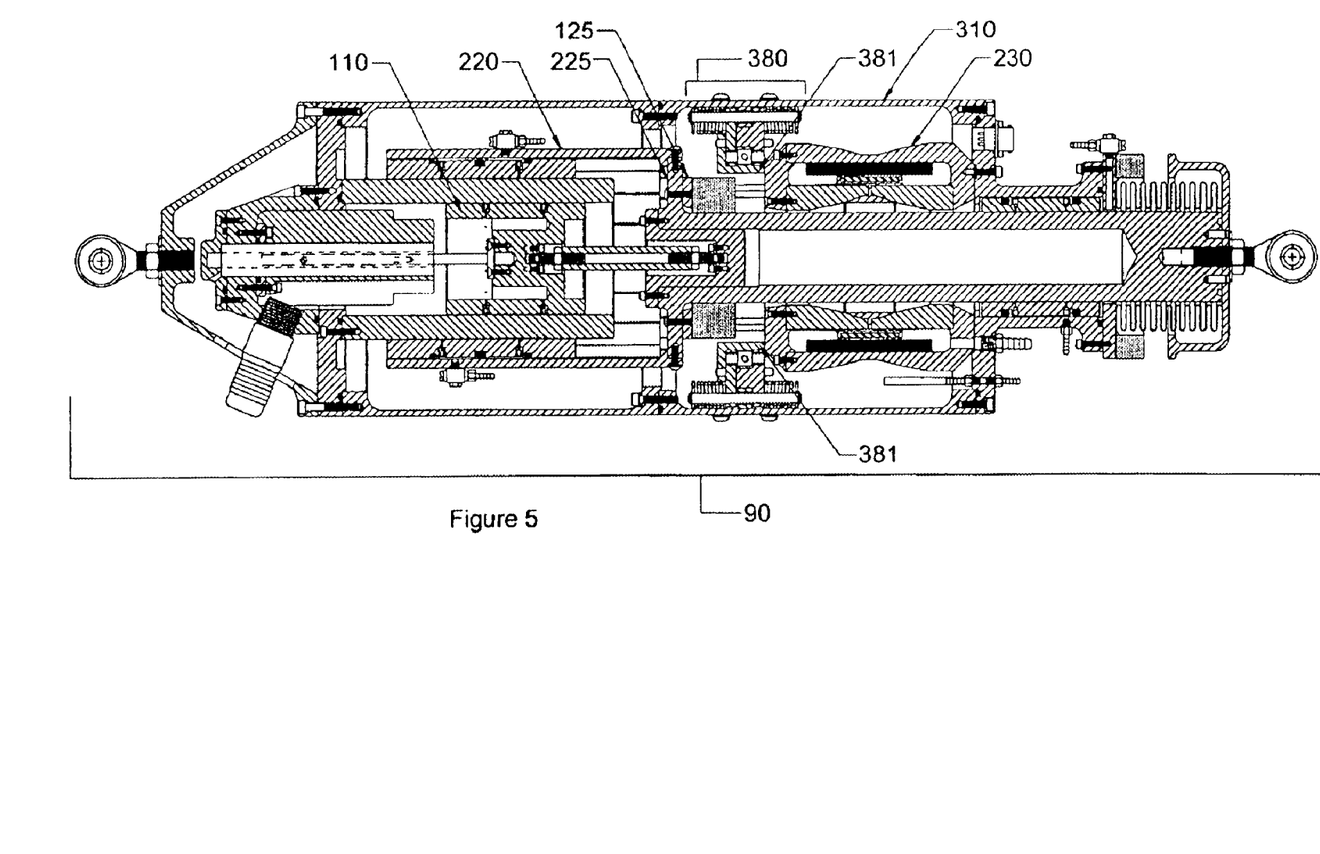
FIG. 5 is a cross section view of a hybrid pneumatic-magnetic isolator-actuator incorporating an extension locking device in accordance with an embodiment of the invention.

In a further embodiment of the invention, an extension locking device is added to the hybrid isolator-actuator for maintaining payload position during power loss and/or for locking the isolator-actuator strut during excessive load applications. An example is shown in FIG. 5 where extension locking device 380 is shown built within a hybrid pneumatic-magnetic isolator-actuator 90. Device 380 is positioned within isolator-actuator 90 such that its actuation causes spacer chocks 381 to move radially inward so to prevent the carriage from motion relative to the base support housing. When moved radially inward, the chocks occupy the space between the flange plate 225 on the inboard end of the journal shaft 130 and the inboard end of the body of the magnetic actuator 230. When the chocks 381 are so positioned, the carriage of the isolator-actuator 100 is held in its fully retracted position within the isolator-actuator frame 310.

Figure 6:
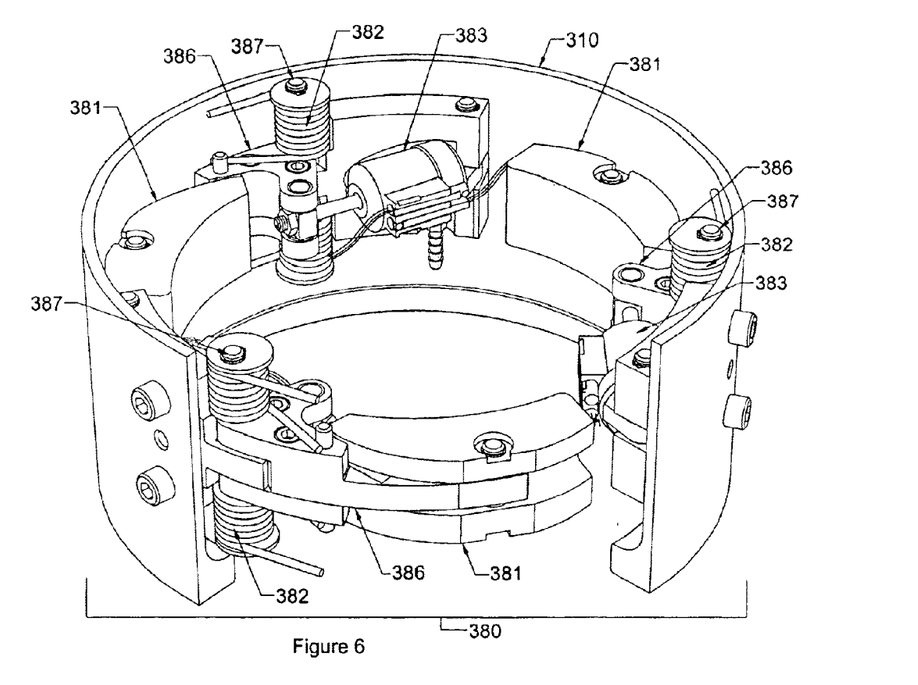
FIG. 6 is a view of an embodiment of an extension locking device suitable for incorporation into a hybrid pneumatic-magnetic isolator-actuator in accordance with an embodiment of the invention.

FIG. 6 depicts a detailed isometric view of locking device 380. Chocks 381 are arranged around the interior perimeter of frame 310 and are supported on bellcranks 386. Bellcranks 386 pivot on shafts 387 and are spring-loaded by torsion springs 382 such that the chocks 381 are held at their radially inward-most position whenever no force is exerted on the bellcranks 386 by the unlock actuation cylinders 383. Application of air pressure to unlock actuation cylinders 383 drives bellcranks 386 such that chocks 381 move radially outward. With chocks 381 so positioned, the carriage assembly can move to extend from the frame 310 of the device. FIG. 6 depicts unlocking device 380 in its actuated mode wherein unlock actuation cylinders 383 are pressurized and chocks 381 are positioned radially outward. Upon removal of air pressure to unlock actuation cylinders 383, torsion springs 382 cause chocks 381 to return to their positions of FIG. 7 where the chocks 381 reside radially inward, away from the interior periphery of frame 310.

In the embodiment of FIG. 5, locking device 380 is attached to frame 310 and is positioned such that chocks 381 are radially positionable between magnetic actuator body 230 and flange plate 225. Chocks 381 thereby mechanically limit the motion between the moving carriage and stationary base support housing of the isolator-actuator 90. Locking device 380 may also be constructed such that chocks 381 clamp on to the base of coil carrier structure 125 and thereby prevent carriage motion at whatever extension position the isolator-actuator may be in.

Figure 7:
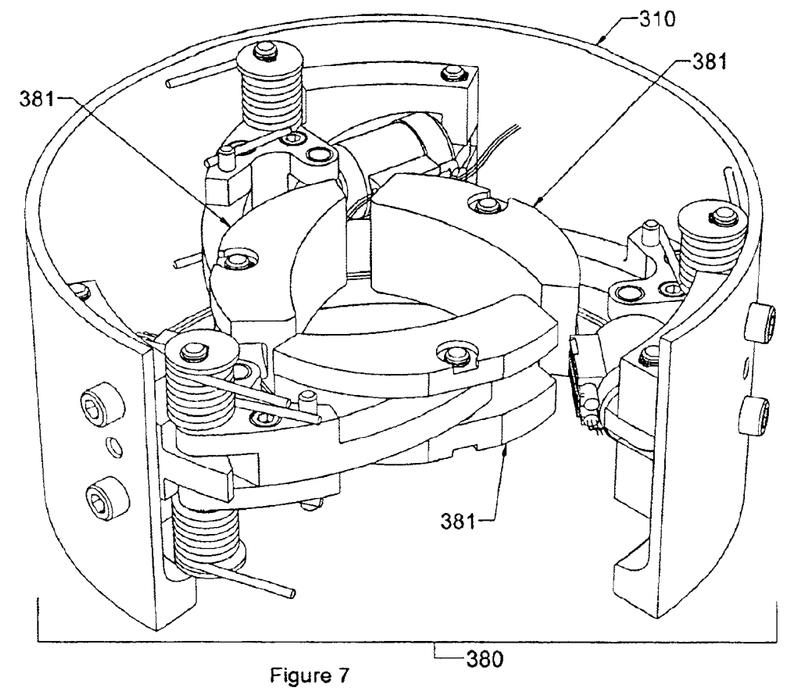
FIG. 7 is a view of the extension locking device of FIG. 6 shown in position for extension locking.

In the embodiment of FIGS. 6 and 7, the locking mechanism 380 is unlocked only when air pressure is applied to unlock actuation cylinders 383. Loss of air pressure to the main pneumatic actuator piston 110 and the unlock actuations cylinders 383 for any reason will cause the carriage of the isolator-actuator 90 to retract into the frame 310 under the weight of the payload 600 and the locking mechanism 380 will lock the carriage in this fully compressed position. The locking mechanism 380 as integrated into the actuator-isolator 90 in the manner shown in FIG. 5 is therefore fail-safe, a desirable attribute for any airborne equipment.

It is appreciated that the actuation of the locking device may be performed in various ways in accordance with embodiments of the invention. Electric motor or electric solenoid drives could be used in place of the pneumatic lock actuation cylinders. For the pneumatic lock actuation cylinders, various gases could be used in place of air. The air or gas supply for the lock actuation cylinders can be the same as or independent of that which drives the piston within the hybrid pneumatic-magnetic isolator-actuator.

In a further embodiment the invention serves as a method for supporting and positioning a payload effecting simultaneous low frequency vibration isolation and large force and stroke position actuation. The method comprises the steps of supporting the payload on a gas piston, commanding the gas pressure applied to the gas piston with a pneumatic servo-valve, measuring the error in pressure resulting upon the gas piston, and applying a magnetic force in parallel to the resulting gas pressure in proportion to the measured pressure error.

In a further embodiment of the method, the step of supporting the payload may be further comprised of sizing a gas tank and a cylinder supporting the piston to a volume providing a gas-spring stiffness to yield a desired low vibration isolation frequency of the payload. The step of supporting the payload on a gas piston may be further comprised of supporting the payload on a frictionless piston supported on gas bearings. The method may further comprise the steps of completely containing the piston and gas bearings within a gas tight housing and feeding and exhausting the piston and bearings such that the method is suitable for vacuum environment application.

Hence, a hybrid pneumatic-magnetic isolator-actuator is disclosed. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be pre-defined by the claims appended hereto and their equivalents.

I claim:

1. A vibration isolation, position actuation device comprising:
   a pneumatic actuator,
   a pressure servo-valve,
   a gas pressure supply,
   a coil and magnet,
   a state variable sensor, and
   a control unit
   wherein the pneumatic actuator is further comprised of a carriage and a housing wherein the carriage is constrained to move within the housing upon a gas film,
   wherein the pressure servo-valve accepts an input command signal and modulates the gas pressure supply which is applied to the pneumatic actuator, wherein the state variable sensor measures a state variable of the pneumatic actuator resulting from the applied modulated gas pressure supply, wherein the control unit determines the error existing in the measured state variable relative to the command signal, and wherein the control unit modulates electrical current applied to the coil such that a magnetic force is effected between the coil and magnet, wherein the magnetic force is directly applied to the carriage of the pneumatic actuator by the magnet without intervening mechanical means, in such proportion to negate the measured error in the state variable of the pneumatic actuator.

2. The device of claim 1 further comprising an air tank connected to the pneumatic actuator such that the combined air volume of the pneumatic actuator and air tank provide an air volume yielding a prescribed air-spring stiffness.

3. The device of claim 1 wherein the control unit compares the amplified voltage from the pressure transducer to the input command signal to determine a force error measurement of the pneumatic actuator such that the control unit is then enabled to apply the force error measurement directly as an input current to the coil.

4. The device of claim 1 wherein the coil is attached to one of the carriage and housing and the magnet is attached to the other.

5. The device of claim 1 wherein the state variable sensor is a pressure transducer positioned to read the pressure applied to the pneumatic actuator and yield an amplified voltage equal to the force resulting from the pneumatic actuator.

* * * * *